United States Patent
Lou et al.

(10) Patent No.: US 11,432,234 B2
(45) Date of Patent: Aug. 30, 2022

(54) METHOD AND SYSTEM FOR SUPPORTING NETWORK SLICE BASED ON A REQUEST FROM A USER

(71) Applicant: HUAWEI TECHNOLOGIES CO., LTD., Guangdong (CN)

(72) Inventors: Chong Lou, Shanghai (CN); Rui Wang, Shanghai (CN); Mingzeng Dai, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/886,411

(22) Filed: May 28, 2020

(65) Prior Publication Data

US 2020/0296663 A1 Sep. 17, 2020

Related U.S. Application Data

(63) Continuation of application No. PCT/CN2018/117874, filed on Nov. 28, 2018.

(30) Foreign Application Priority Data

Nov. 30, 2017 (CN) .......................... 201711233499.0

(51) Int. Cl.
*H04W 48/18* (2009.01)
*H04W 76/11* (2018.01)
(Continued)

(52) U.S. Cl.
CPC .......... *H04W 48/18* (2013.01); *H04W 24/02* (2013.01); *H04W 72/04* (2013.01); *H04W 76/11* (2018.02)

(58) Field of Classification Search
CPC ..... H04W 48/18; H04W 76/11; H04W 24/02; H04W 72/04; H04W 76/12; H04W 76/15;
(Continued)

(56) References Cited

U.S. PATENT DOCUMENTS 11,310,801 B2 * 4/2022 Yu et al. ............. H04W 72/048
2016/0353367 A1 * 12/2016 Vrzic et al. ........... H04W 48/18
(Continued)

FOREIGN PATENT DOCUMENTS

| CN | 107071799 A | 8/2017 |
|----|-------------|--------|
| CN | 107347205 A | 11/2017 |

(Continued)

OTHER PUBLICATIONS

3GPP TS 38.413 V0.4.0 (Oct. 2017), "3rd Generation Partnership Project; Technical Specification Group Radio Access Network; NG Radio Access Network (NG-RAN); NG Application Protocol (NGAP) (Release 15)," Oct. 2017, 88 pages.

(Continued)

*Primary Examiner* — Meless N Zewdu
(74) *Attorney, Agent, or Firm* — Fish & Richardson P.C.

(57) ABSTRACT

Disclosed herein are methods, systems, and apparatus for wireless communications. One of the systems includes: a non-transitory computer-readable memory comprising computer-executable instructions; and at least one processor in communication with the memory, wherein the computer-executable instructions instruct the at least one processor to perform operations comprising: sending, to a core network node, a first message comprising identification information of a network slice supported by a second access network node; and receiving, from the core network node, a first response message responsive to the first message.

14 Claims, 6 Drawing Sheets

(51) Int. Cl.
*H04W 24/02* (2009.01)
*H04W 72/04* (2009.01)

(58) Field of Classification Search
CPC ............ H04W 36/0069; H04W 48/08; H04W 72/0406; H04W 28/0831; H04W 28/0835; H04W 28/0842; H04W 28/00; H04W 36/0011; H04W 36/0016; H04W 36/0022; H04W 36/385; H04W 76/00; H04W 76/10; H04W 76/16; H04W 88/00; H04W 88/02; H04W 88/08; H04W 88/04; H04W 88/023; H04W 88/12; H04W 88/14; H04W 88/16; H04W 88/18; H04W 92/00; H04W 92/02; H04W 92/04; H04W 92/16; H04W 92/24; H04W 92/20; H04W 92/22

See application file for complete search history.

(56) References Cited

U.S. PATENT DOCUMENTS

| | | | |
|---|---|---|---|
| 2017/0164349 A1* | 6/2017 | Zhu et al. | H04W 72/048 |
| 2017/0289791 A1* | 10/2017 | Yoo et al. | H04W 8/183 |
| 2018/0324645 A1* | 11/2018 | Park et al. | H04W 36/0016 |
| 2019/0124589 A1* | 4/2019 | Bogineni et al. | H04W 48/18 |
| 2019/0159117 A1* | 5/2019 | Kuge et al. | H04W 48/18 |
| 2019/0349774 A1* | 11/2019 | Lou et al. | H04W 16/10 |
| 2019/0357132 A1* | 11/2019 | Sun et al. | H04W 48/18 |
| 2020/0059987 A1* | 2/2020 | Hong et al. | H04W 76/27 |
| 2020/0205062 A1* | 6/2020 | Azizi et al. | H04W 48/16 |
| 2020/0275356 A1* | 8/2020 | Forsman et al. | H04W 48/18 |
| 2020/0288384 A1* | 9/2020 | Li et al. | H04W 48/16 |
| 2020/0305054 A1* | 9/2020 | Zee et al. | H04W 36/32 |
| 2020/0314740 A1* | 10/2020 | Lee et al. | H04W 48/18 |
| 2020/0374792 A1* | 11/2020 | Liu | H04W 48/18 |
| 2021/0282082 A1* | 9/2021 | Mildh et al. | H04W 48/18 |

FOREIGN PATENT DOCUMENTS

| | | |
|---|---|---|
| EP | 3687213 A1 | 7/2020 |
| WO | 2017098441 A1 | 6/2017 |
| WO | 2017135860 A1 | 8/2017 |

OTHER PUBLICATIONS

CMCC, "Slice Availability Impact on Dual Connectivity," 3GPP TSG-RAN WG3 MEeting #96, R3-171666, Hangzhou, China, May 15-19, 2017, 4 pages.
CMCC, "Slice Impact on Multi-Connectivity," 3GPP TSG-RAN WG3 #97, R3-173144, Berlin, Germany, Aug. 21-25, 2017, 4 pages.
Extended European Search Report issued in European Application No. 18883906.2 dated Aug. 28, 2020, 11 pages.
Huawei, HiSilicon, "Key Issues for Support of Network Slicing in RAN", 3GPP TSG-RAN WG2 NR Ad Hoc, R2-1700099, Spokane, Washington, USA, Nov. 17-19, 2017, 6 pages.
Huawei, "RAN configuration of network slices," RAN WG3 Meeting #92, R3-161135, Nanjing, China, May 23-27, 2016, 5 pages.
Huawei, HiSilicon, "Slice Availability and Discovery in RAN," 3GPP TSG-RAN WG2 NR Ad Hoc, R2-1700102, Spokane, Washington, USA, Jan. 17-19, 2017, 6 pages.
Huawei, HiSilicon, "Slice Availability and Discovery in RAN," 3GPP TSG-RAN WG2#97, R2-1701218, Athens, Greece; Feb. 13-17, 2017, 6 pages.
Huawei, "Dual Connectivity for Slicing," 3GPP TSG RAN WG3 95bis, R3-171252, Spokane, Washington, Apr. 3-7, 2017, 4 pages.
LG Electronics Inc., "TP for exchange of NSSAI in Xn Setup Procedure, "3GPP TSG-RAN WG3 Meeting #95bis, R3-171351, Spokane, USA, Apr. 3-7, 2017, 2 pages.
Office Action issued in Chinese Application 201711233499.0 dated Apr. 26, 2020, 12 pages (with English translation).
PCT International Search Report and Written Opinion issued in International Application No. PCT/CN2018/117874 dated Mar. 6, 2019, 18 pages (with English translation).
ZTE, "Network Slice Selection Procedure," 3GPP TSG RAN WG3 Meeting #92, R1-161107, Nanjing, China, May 23-27, 2016, 4 pages.

* cited by examiner

METHOD AND SYSTEM FOR SUPPORTING NETWORK SLICE BASED ON A REQUEST FROM A USER

CROSS-REFERENCE TO RELATED APPLICATIONS

This application is a continuation of International Application No. PCT/CN2018/117874, filed on Nov. 28, 2018, which claims priority to Chinese Patent Application No. 201711233499.0, filed on Nov. 30, 2017. The disclosures of the aforementioned applications are hereby incorporated by reference in their entireties.

TECHNICAL FIELD

This application relates to the communications field, and more specifically, to a communication method and a communications apparatus.

BACKGROUND

In a fifth-generation communications (fifth-generation, 5G) system, a network architecture of a network slice NS (network slice, NS) is proposed, to cope with different user requirements. However, in an actual network, some network slices may be deployed only in a local network area. In other words, a network device may not support all network slices. When the network device does not support a network slice requested by a user, how to provide a network slice service for user equipment to improve user experience is an urgent problem to be resolved.

SUMMARY

This application provides a communication method and a communications apparatus, to help improve user experience.

According to a first aspect, a communication method is provided. The communication method includes: sending, by a first access network node, a first message to a core network node, where the first message includes identification information of a network slice supported by a second access network node; and receiving, by the first access network node, a first response message sent by the core network node, where the first response message is a response message for the first message.

Therefore, according to the communication method in this embodiment of this application, the first access network node may report, to the core network node, information about a network slice supported by another access network node, so that the core network node can manage information about network slices supported by a plurality of access network nodes. For example, the core network node may add information about the network slice supported by the second access network node to a network slice set supported by the first access network node, or the core network node may add information about a network slice supported by the first access network node to a network slice set supported by the second access network node. Further, the first access network node and the second access network node may provide a network slice service for a terminal device through dual-connectivity. This helps avoid a problem of affecting user experience due to directly rejecting a service request for a network slice when the first access network node does not support the network slice but the second access network node supports the network slice.

Optionally, in this embodiment of this application, the first message is an interface message used for communication between a RAN node and a CN node, for example, an NG setup request (NG SETUP REQUEST) message, a gNB configuration update (GNB CONFIGURATION UPDATE) message, or a RAN configuration update (RAN CONFIGURATION UPDATE) message. Similarly, the first response message is an interface message used for communication between the RAN node and the CN node, for example, an NG setup request response message or a core network configuration update message.

With reference to the first aspect, in some possible implementations of the first aspect, the first message is used to instruct the core network node to update a first network slice set supported by the first access network node.

To be specific, after receiving the first message, the core network node may update, based on the first message, the first network slice set supported by the first access network node, and add the network slice supported by the second access network node to the network slice set supported by the first access network node, to provide a network slice service for the terminal device through a dual-connection between the first access network node and the second access network node, improving user experience.

With reference to the first aspect, in some possible implementations of the first aspect, the first network slice set includes a network slice not supported by the first access network node but supported by the second access network node.

Therefore, when the first access network node does not support a network slice, but the second access network node supports the network slice, the first access network node may provide a service of the network slice for the terminal device through a dual-connection between the first access network node and the second access network node, to improve user experience.

With reference to the first aspect, in some possible implementations of the first aspect, the first network slice set is determined based on a status of a network slice supported by the first access network node and a status of the network slice supported by the second access network node, or the first network slice set is determined based on a status of a network slice supported by the first access network node, a status of the network slice supported by the second access network node, and a status of a network slice that a terminal device requests to access or is allowed to access.

Optionally, in this embodiment of this application, the first message may be sent before the terminal device establishes a connection to the first access network node (denoted as a scenario 1) or after the terminal device establishes a connection to the first access network node (denoted as a scenario 2). This is not limited in this embodiment of this application.

In the scenario 1, the first access network node does not need to send, each time the terminal device establishes a connection to the first access network node, the first message to the core network node based on information about the network slice that the terminal device requests to access or is allowed to access, to reduce information exchange between the first access network node and the core network node.

In the scenario 2, the first access network node may report information by comprehensively considering information about network slices that the terminal device requests to access or is allowed to access. Information about a proper network slice in the network slices that the terminal device requests to access or is allowed to access is added to the first message sent to the core network node, so that a proper network slice service can be provided for the terminal device.

With reference to the first aspect, in some possible implementations of the first aspect, the method further includes:

forwarding, by the first access network node to the core network node, a second message sent by the terminal device, where the second message is used to request the core network node to configure service information corresponding to a network slice in a second network slice set, and the second network slice set includes at least one network slice in the first network slice set;

receiving, by the first access network node, a second response message sent by the core network node, where the second response message includes the service information corresponding to the network slice in the second network slice set; and sending, by the first access network node, a third message to the second access network node, where the third message includes service information corresponding to a network slice that is in the second network slice set and that is supported by the second access network node.

Therefore, when the first access network node does not support a network slice, but the second access network node supports the network slice, the first access network node may forward, to the second access network node, service information configured by the core network node for the network slice, so that the second access network node adds the service information of the network slice, to provide a service of the network slice for the terminal device.

Optionally, the second message may be a protocol data unit (protocol data unit, PDU) session establishment request message, and is used to request the core network node to configure a corresponding resource for a service requested by the terminal device. For example, the terminal device may add the PDU session establishment request message to an uplink RRC message.

Optionally, the third message may be a message used for communication between RAN nodes. For example, the third message may be an SN addition request message. The SN addition request message may be further used to request the second access network node to support a dual-connection or multi-connection operation on the terminal device, that is, to provide a service for the terminal device through a dual-connection between the first access network node and the second access network node or multi-connection between the first access network node and more access network nodes.

With reference to the first aspect, in some possible implementations of the first aspect, the method further includes:

receiving, by the first access network node, a fourth message sent by the terminal device, where the fourth message includes the identification information of the network slice supported by the second access network node, and the identification information of the network slice supported by the second access network node is sent by the second access network node to the terminal device.

Optionally, in this embodiment of this application, the method further includes:

sending, by the first access network node, a first request message to the second access network node, where the first request message is used to request the identification information of the network slice supported by the second access network node; and receiving, by the first access network node, a first request response message sent by the second access network node, where the first request response message includes the identification information of the network slice supported by the second access network node.

Optionally, the first request message may be a handover request message, or may be another message used for communication between the RAN nodes. Correspondingly, the first request response message may be a handover request acknowledgment message, or may be another message used for communication between the RAN nodes. This is not limited in this embodiment of this application.

Optionally, the first request message may include identification information of the network slice supported by the first access network node. Therefore, any two access network nodes having a communications interface in a communications system may learn, in the foregoing manner, of information about network slices supported by each other.

Optionally, in this embodiment of this application, the method further includes:

sending, by the first access network node, a first interface message to the terminal device, where the first interface message includes identification information of the network slice supported by the first access network node;

sending, by the second access network node, a second interface message to the terminal device, where the second interface message includes the identification information of the network slice supported by the second access network node; and sending, by the terminal device, a third interface message to the first access network node, where the third interface message includes the identification information of the network slice supported by the second access network node.

Therefore, any two access network nodes having no communications interface may exchange, by using the terminal device for transit, statuses of network slices supported by the two access network nodes.

Optionally, the first interface message may be a system message. That is, re first access network node may broadcast, by using the system message, the information about the network slice supported by the first access network node, or may broadcast, by using the system message, information about a network slice supported by a neighboring node of the first access network node. Alternatively, the first interface message may be dedicated signaling, for example, a message used for communication between the terminal device and an access network node, such as an RRC message or a media access control (media access control, MAC) message. Similarly, this is also true for the second interface message. For brevity, details are not described again.

Optionally, the third interface message may be an air interface message, such as an RRC message or a MAC message. This is not limited in this embodiment of this application. Similarly, this is also true for a fourth interface message. For brevity, details are not described again.

Optionally, the first interface message may be an independent message. For example, a dedicated system message may be added to broadcast information about the network slice. Alternatively, the first interface message may be an existing message. For example, an attribute field may be added to the existing message to cam/information about the network slice. Similarly, this is also true for the second interface message. For brevity, details are not described again.

Optionally, the third interface message may be an independent message. For example, an air interface message may be added to send information about the network slice. Alternatively, the third interface message may be an existing air interface message. For example, an attribute field may be added to the existing air interface message to carry information about the network slice. Similarly, this is also true for a fourth interface message. For brevity, details are not described again.

Optionally, in this embodiment of this application, the method further includes:

sending, by the first access network node, a first notification message to the core network node, where the first notification message includes the identification information of the network slice supported by the first access network node;

replying, by the core network node, to the first access network node with a first acknowledgment message, where the first acknowledgment message is used to notify the first access network node that the first notification message is received;

sending, by the second access network node, a second notification message to the core network node, where the second notification message includes the identification information of the network slice supported by the second access network node;

replying, by the core network node, to the second access network node with a second acknowledgment message, where the second acknowledgment message is used to notify the second access network node that the second notification message is received;

sending, by the core network node, a third notification message to the first access network node, where the third notification message includes the identification information of the network slice supported by the second access network node; and sending, by the core network node, a fourth notification message to the second access network node, where the fourth notification message includes the identification information of the network slice supported by the first access network node.

Therefore, any two access network nodes having no communications interface may exchange, by using the core network node for transit, statuses of network slices supported by the two access network nodes.

Optionally, the first notification message may be an N2 interface message, for example, an N2 interface setup request message, a RAN node configuration update request message, or another message used for communication between the RAN node and the CN node. This is not limited in this embodiment of this application. Similarly, this is also true for the second notification message. For brevity, details are not described herein again.

Correspondingly, the first acknowledgment message may be an N2 interface message, for example, an N2 interface setup response message, a CN node configuration update request message, or another message used for communication between the RAN node and the CN node. This is not limited in this embodiment of this application. Similarly, this is also true for the second acknowledgment message. For brevity, details are not described herein again.

Optionally, the first notification message may be an independent message. For example, a dedicated message may be added to send information about the network slice. Alternatively, the first notification message may be an existing message. For example, an attribute field may be added to the existing message to carry information about the network slice. Similarly, this is also true for other messages. For brevity, details are not described herein again.

According to a second aspect, a communication method is provided and includes: receiving, by a core network node, a first message sent by a first access network node, where the first message includes identification information of a network slice supported by a second access network node; and sending, by the core network node, a first response message to the first access network node, where the first response message is a response message for the first message.

Therefore, according to the communication method in this embodiment of this application, the core network node may receive information that is about a network slice supported by another access network node and that is reported by the first access network node, so that the core network node can manage information about network slices supported by a plurality of access network nodes. For example, the core network node may add information about the network slice supported by the second access network node to a network slice set supported by the first access network node, or the core network node may add information about a network slice supported by the first access network node to a network slice set supported by the second access network node. Further, the first access network node and the second access network node may provide a network slice service for a terminal device through dual-connectivity. This helps avoid a problem of affecting user experience due to directly rejecting a service request for a network slice when the first access network node does not support the network slice but the second access network node supports the network slice.

With reference to the second aspect, in some possible implementations of the second aspect, the method further includes:

updating, by the core network node based on the first message, a first network slice set supported by the first access network node.

With reference to the second aspect, in some possible implementations of the second aspect, the first network slice set includes a network slice not supported by the first access network node but supported by the second access network node.

With reference to the second aspect, in some possible implementations of the second aspect, the first network slice set is determined based on a status of a network slice supported by the first access network node and a status of the network slice supported by the second access network node, or the first network slice set is determined based on a status of a network slice supported by the first access network node, a status of the network slice supported by the second access network node, and a status of a network slice that a terminal device requests to access or is allowed to access.

With reference to the second aspect, in some possible implementations of the second aspect, the method further includes:

receiving, by the core network node, a second message sent by the terminal device by using the first access network node, where the second message is used to request the core network node to configure service information corresponding to a network slice in a second network slice set, and the second network slice set includes at least one network slice in the first network slice set: and sending, by the core network node, a second response message to the first access network node, where the second response message includes the service information corresponding to the network slice in the second network slice set.

According to a third aspect, a communication method is provided. The communication method includes:

receiving, by a terminal device, a fifth message sent by a second access network node, where the fifth message includes identification information of a network slice supported by the second access network node; and sending, by the terminal device, a fourth message to a first access network node, where the fourth message includes a network slice identifier corresponding to the network slice supported by the second access network node.

Therefore, the terminal device may be used for transit, to exchange information about network slices supported by two access network nodes.

Optionally, the fifth message may be a system message. That is, the second access network node may broadcast, by using the system message, information about the network slice supported by the second access network node. Alternatively, the fifth message may be dedicated signaling, for example, a message used for communication between the terminal device and an access network node, such as an RRC message or a media access control (media access control, MAC) message.

Optionally, the fourth message may be an air interface message, such as an RRC message or a MAC message. This is not limited in this embodiment of this application.

According to a fourth aspect, a communications apparatus is provided, and is configured to perform the method according to any one of the first aspect or the possible implementations of the first aspect, or configured to perform the method according to any one of the second aspect or the possible implementations of the second aspect, or configured to perform the method according to any one of the third aspect or the possible implementations of the third aspect. Specifically, the communications apparatus may include units configured to perform the method according to any one of the first aspect or the possible implementations of the first aspect, or units configured to perform the method according to any one of the second aspect or the possible implementations of the second aspect, or units configured to perform the method according to any one of the third aspect or the possible implementations of the third aspect.

According to a fifth aspect, a communications apparatus is provided and includes a memory and a processor. The memory is configured to store a computer program, and the processor is configured to invoke the computer program from the memory and run the computer program, so that the communications apparatus performs the method according to any one of the first aspect or the possible implementations of the first aspect, or performs the method according to any one of the second aspect or the possible implementations of the second aspect, or performs the method according to any one of the third aspect or the possible implementations of the third aspect.

According to a sixth aspect, a computer program product is provided. The computer program product includes computer program code. When the computer program code is run by a communications unit and a processing unit or a transceiver and a processor of a communications apparatus (for example, a network device or a terminal device), the communications apparatus is enabled to perform the method according to any one of the first to the third aspects or the possible implementations of the first to the third aspects.

According to a seventh aspect, a computer-readable storage medium is provided. The computer-readable storage medium stores a program. The program enables a communications apparatus to perform the method according to any one of the first to the third aspects or the possible implementations of the first to the third aspects.

DESCRIPTION OF EMBODIMENTS

The following describes technical solutions of this application with reference to accompanying drawings.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, the components may be executed from various computer-readable media that store various data structures. For example, the components may communicate by using a local and/or remote process based on a signal having one or more data packets (for example, data from two components interacting with another component in a local system, in a distributed system, and/or across a network such as the Internet interacting with other systems by using the signal).

It should be understood that embodiments of this application may be applied to various communications systems that support a network slice architecture, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, a long term evolution advanced (long term evolution advanced, LTE-A) system, a universal mobile telecommunications system (universal mobile telecommunications system, UMTS), or a next-generation communications system, such as a new radio (new radio, NR) system or an evolved LTE (evolved LTE, eLTE) system.

Figure 1:
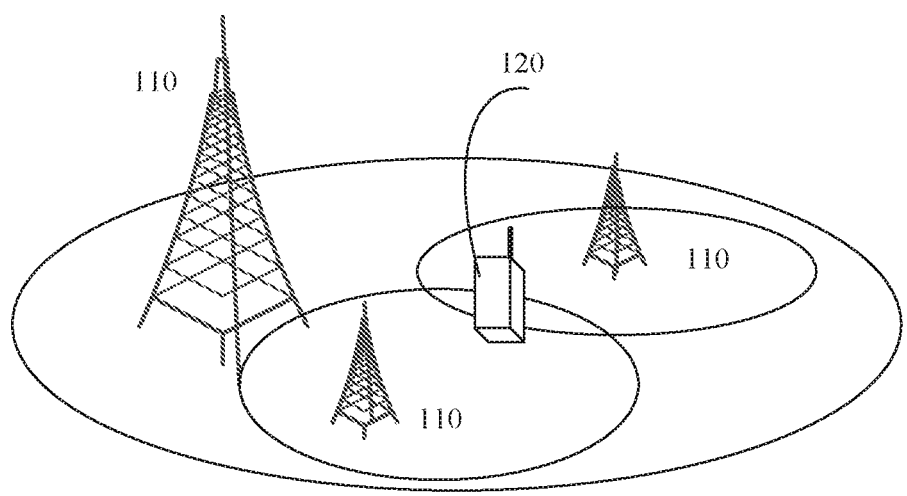
FIG. 1 is a schematic diagram of a wireless communications system according to an embodiment of this application.

FIG. 1 shows a wireless communications system 100 to which an embodiment of this application is applied. The wireless communications system 100 may include a network device 110.

The network device 110 may be a radio access network (radio access network, RAN) device or a core network (core network, CN) device that communicates with a mobile device. The RAN device may be an access point (access point, AP) in a ULAN or a base transceiver station (base transceiver station, BTS) in GSM or CDMA, may be a NodeB (NodeB, NB) in WCDMA, or may be an evolved NodeB (evolutional node B, eNB or eNodeB) in LTE, a relay station or an access point, a vehicle-mounted device, a wearable device, a network device in a future 5G network, or a network device in a future evolved PLMN network, for example, a base station that may be connected to a 5G core network device, a transmission reception point (transmission and reception point, TRP), a central processing unit (centralized unit. CU), or a distributed processing unit (distributed unit, DU).

The CN device may be a mobility management entity (mobile management entity, MME) and a gateway (gateway) in LTE, or may be a control plane (control plane, CP) network function (network function, NF) and a user plane (user plane, UP) network function in a 5G network, for example, a common control plane network function (common CP NF, CCNF) and a session management network function (session management NF, SMNF).

The communications system in this embodiment of this application may support dual-connectivity (dual-connectivity, DC) or multi-connectivity (multi-connectivity, MC). A terminal device may simultaneously establish connections to two or more network devices, to improve performance, for example, a throughput of the terminal device.

For example, the terminal device may use a network node in an LTE system as a master node (master node, MN), use a network node in an NR system as a slave node (slave node, SN), and simultaneously connect the MN and the SN to a next generation core network (next generation core network, NGC). Alternatively, the terminal device may use a network node in an NR system as an MN, use a network node in an LTE system as an SN, and simultaneously connect the MN and the SN to an NGC. Alternatively, an MN and an SN may be network nodes in a same communications system. For example, both the MN and the SN may be network nodes in an NR system, or may be network nodes in an LTE system.

In addition, in this embodiment of this application, the network device provides a service for a cell, and the terminal device communicates with the network device by using a transmission resource (for example, a frequency domain resource or a spectrum resource) used in the cell. The cell may be a cell corresponding to the network device (for example, a base station). The cell may belong to a macro base station and a hyper cell (hyper cell), or may belong to a base station corresponding to a small cell (small cell). The small cell herein may include a metro cell (metro cell), a micro cell (micro cell), a pico cell (pica cell), a femto cell (femto cell), or the like. These small cells are characterized by a small coverage area and a low transmit power, and are suitable for providing a high-rate data transmission service.

The wireless communications system 100 further includes at least one terminal device 120 located within a coverage area of the network device 110. The terminal device may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STATION, STA) in a wireless local area network (wireless local area networks, WLAN), or may be a cellular phone, a cordless phone, a session initiation protocol (session initiation protocol, SIP) phone, a wireless local loop (wireless local loop, WLL) station, a personal digital assistant (personal digital assistant, PDA) device, a handheld device with a wireless communication function, a relay device, a computing device or another processing device connected to a wireless modem, a vehicle-mounted device, a wearable device, and a next-generation communications system, for example, a terminal device in a fifth-generation communications (fifth-generation, 5G) network or a terminal device in a future evolved public land mobile network (public land mobile network, PLMN).

By way of example rather than limitation, in this embodiment of this application, the terminal device may alternatively be a wearable device. The wearable device may also be referred to as a wearable intelligent device, and is a generic name of wearable devices developed by intelligently designing daily wear by using a wearable technology, for example, glasses, gloves, a watch, clothing, or shoes. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices that can implement complete or partial functions without depending on smartphones, for example, smart watches or smart glasses, and devices that focus only on one type of application function and need to work with other devices such as smartphones, for example, various smart bands or smart, jewelry for monitoring physical signs.

A communication method and a communications apparatus that are provided in the embodiments of this application may be applied to a network device. The network device may include an access network device and a core network device. The network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). A operating system may be any one or more computer operating systems that implement service processing by using a process (process), for example, a Linux operating system, a Unix operating system, an Android operating system, an iOS operating system, or a windows operating system. The application layer includes applications such as a browser, an address book, text processing software, and instant messaging software. In addition, in the embodiments of this application, a specific structure of an execution body of the communication method is not particularly limited in the embodiments of this application, provided that a program that records code of the communication method in the embodiments of this application can be run to perform communication according to the communication method in the embodiments of this application. For example, the execution body of the communication method in the embodiments of this application may be a network device or a function module that is in a network device and that can invoke and execute a program.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but are not limited to a radio channel and various other media that can store, include, and/or carry an instruction and/or data.

The following describes the communication method according to the embodiments of this application in detail with reference to FIG. 2 to FIG. 5.

It should be understood that FIG. 2 to FIG. 5 are schematic flowcharts of the communication method according to the embodiments of this application, and show detailed communication steps or operations of the method. However, these steps or operations are merely examples. In the embodiments of this application, other operations or variations of the operations in FIG. 2 to FIG. 5 may be further performed.

Figure 2:
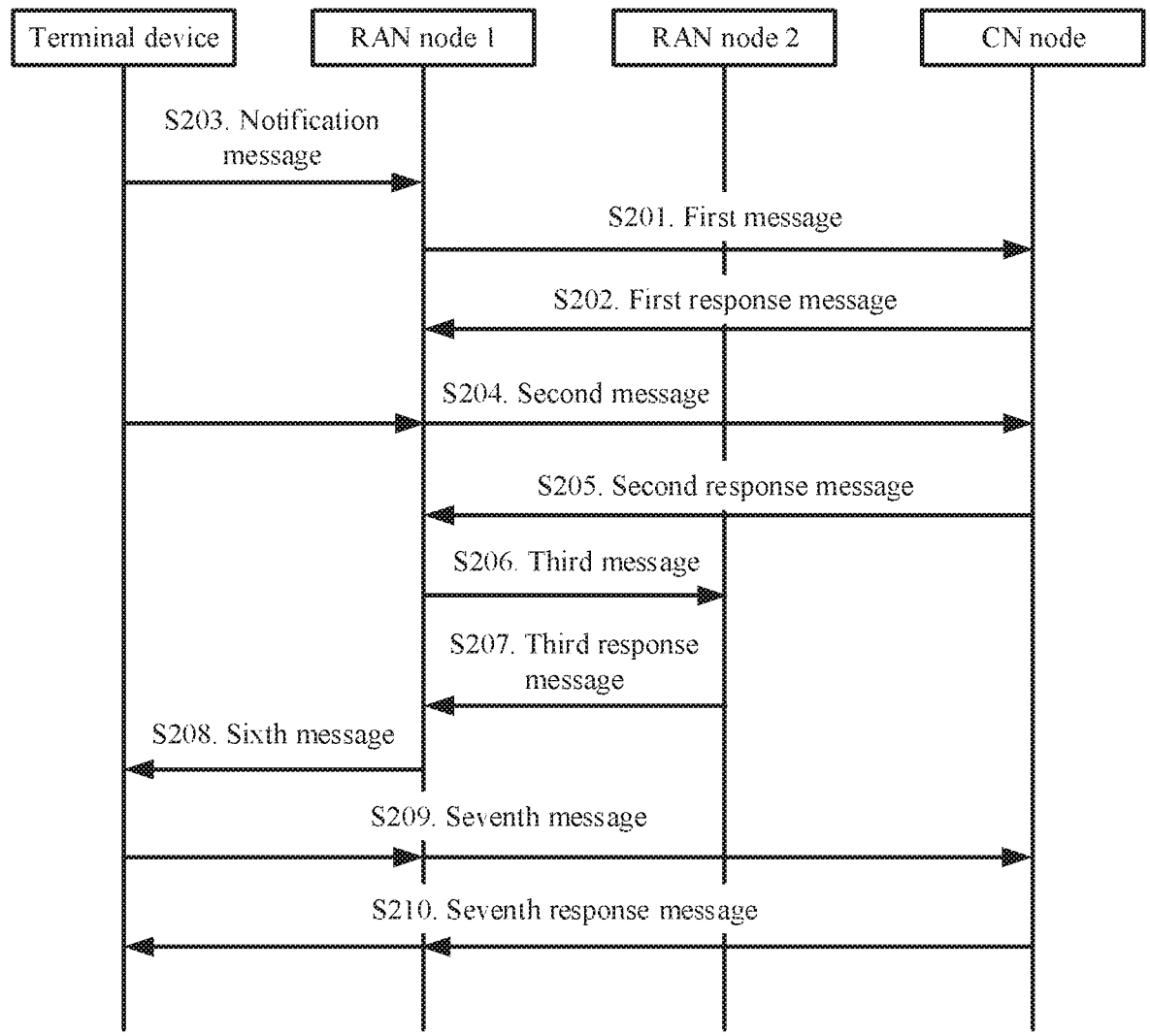
FIG. 2 is a schematic interaction diagram of a communication method according to an embodiment of this application.
Figure 3:
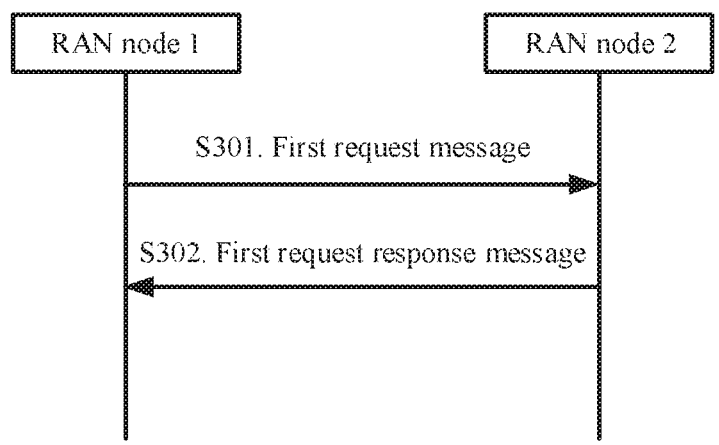
FIG. 3 is a schematic interaction diagram of a communication method according to another embodiment of this application.
Figure 4:
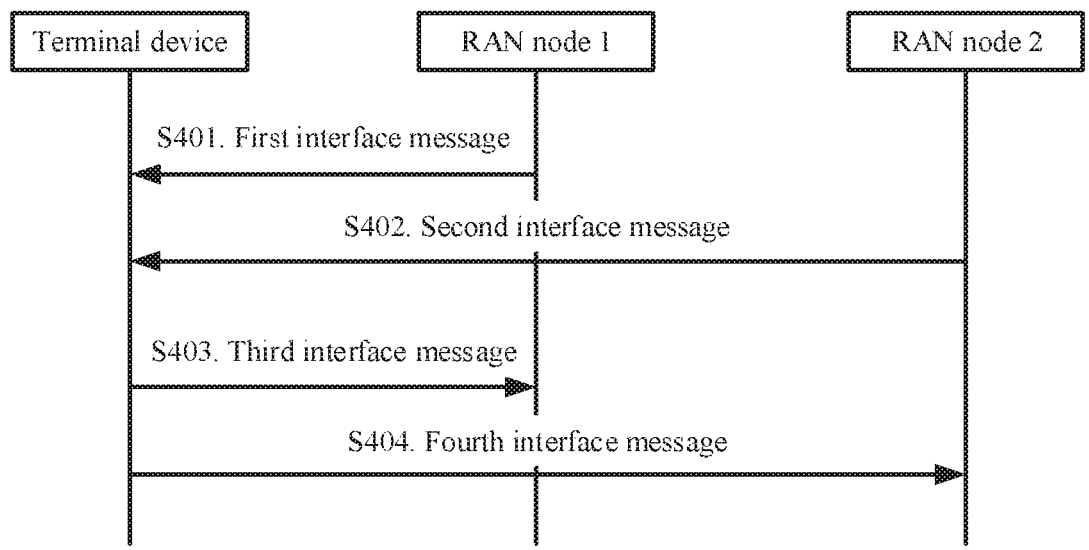
FIG. 4 is a schematic interaction diagram of a communication method according to still another embodiment of this application.
Figure 5:
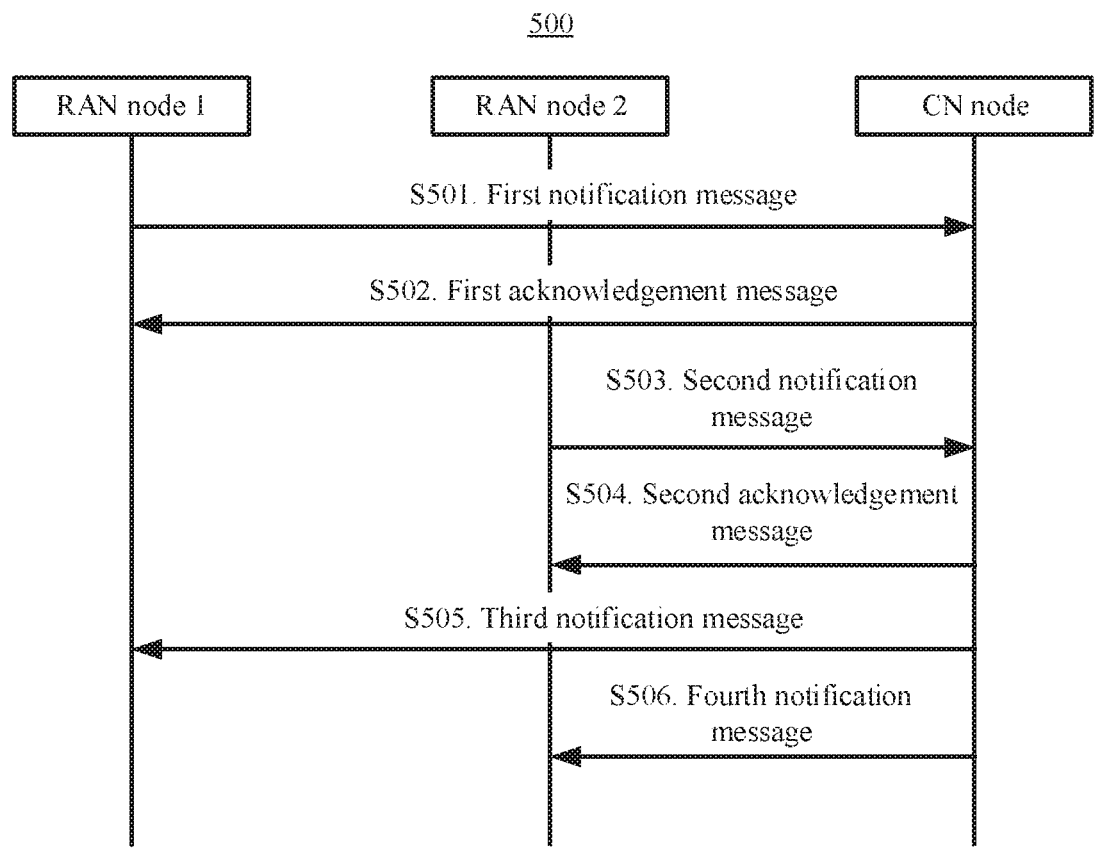
FIG. 5 is a schematic interaction diagram of a communication method according to still another embodiment of this application.

In addition, the steps in FIG. 2 and FIG. 5 may be separately performed in sequences different from sequences shown in FIG. 2 and FIG. 5, and it is likely that not all the operations in FIG. 2 to FIG. 5 need to be performed.

FIG. 2 is a schematic interaction diagram of a communication method 200 according to an embodiment of this application, where the communication method 200 is described from a perspective of device interaction. The method 200 may be applied to the communications system 100 shown in FIG. 1.

As shown in FIG. 2, the communication method 200 includes the following content.

S201. A first access network node (denoted as a RAN node 1) sends a first message to a core network node, where the first message includes identification information of a network slice supported by a second access network node (denoted as a RAN node 2).

S202. The first access network node receives a first response message sent by the core network node (denoted as a CN node), where the first response message is a response message for the first message.

Specifically, the core network node is a core network node in a communications system to which the first access network node belongs. The first access network node may report, to the core network node, information about a network slice supported by another access network node, so that the core network node can manage information about network slices supported by a plurality of access network nodes. For example, the core network node may add information about the network slice supported by the second access network node to a network slice set supported by the first access network node, or the core network node may add information about a network slice supported by the first access network node to a network slice set supported by the second access network node. Further, the first access network node and the second access network node may provide a network slice service for a terminal device through dual-connectivity. This helps avoid a problem of affecting user experience due to directly rejecting a service request for a network slice when the first access network node does not support the network slice but the second access network node supports the network slice.

It should be understood that, in this embodiment of this application, cells supported by the first access network node and the second access network node may belong to same or different registration areas and/or paging areas. The cells may have same or different registration area identifiers and/or paging area identifiers. Further, the registration area and the paging area are used when a network side pages the terminal device. When the terminal device moves to a new registration area and/or paging area, a registration area/paging area update process may be triggered to update a stored registration area and/or paging area identifier list.

Optionally, in this embodiment of this application, identification information of each network slice may be represented by using at least one of the following parameters:

1. Network slice type information: For example, the network slice type information may indicate a network slice type such as enhanced mobile broadband (enhanced mobile broadband, eMBB), ultra-reliable low-latency communication (ultra-reliable low latency communications, URLLC), or massive machine-type communications (massive machine type communication, mMTC). Optionally, the network slice type information may further indicate an end-to-end network slice type, including a RAN-to-CN network slice type, or Olay indicate a RAN-side network slice type or a CN-side network slice type.

2. Service type information: The service type information is related to a specific service. For example, the service type information may indicate service features of a video service, an internet of vehicles service, a voice service, and the like or information about the specific service. It should be understood that the service type information and the network slice type information may be combined into one type of information.

3. Tenant (tenant) information: The tenant information is used to indicate information about a user that creates or rents the network slice, for example, Tencent or State Grid.

4. User group information: The user group information is used to indicate group information obtained by grouping users based on a feature, for example, levels of the users.

5. Slice group information: The slice group information is used to indicate that network slices are grouped based on a feature, for example, all network slices accessible by the terminal device may be grouped into a slice group, or that network slices are grouped according to another standard.

6. Network slice instance information: The network slice instance information is used to indicate an identifier and feature information of an instance created for the network slice. For example, an identifier may be allocated to a network slice instance, to indicate the network slice instance, or a new identifier may be obtained through mapping of an identifier of a network slice instance, to be associated with the network slice instance, and in this case, a receiving party can identify, based on the identifier, the specific network slice instance indicated by the identifier.

7. Dedicated core network (dedicated core network, DCN) identifier: The identifier is used to uniquely indicate a dedicated core network in an LTE system or an eLTE system, for example, a dedicated core network for the interact of things. Optionally, mapping may be performed between the DCN identifier and a network slice identifier. The network slice identifier may be obtained through mapping of the DCN identifier, and the DCN identifier may also be obtained through mapping of the network slice identifier.

8. A network slice differentiator (differentiator): The network slice differentiator is used to further differentiate information about network slices. Optionally, two or more network slices have a same network slice type and/or service type, but the two or more network slices may be further differentiated based on network slice differentiation information. In other words, both the network slice type information and the network slice differentiator may be used to identify a network slice.

It should be understood that in this embodiment of this application, at least one of the foregoing parameters may be used to indicate identification information of a network slice in the first network slice set. For example, the identification information of the network slice may be represented by a network slice type, or may be represented by a network slice type and a service type, or may be represented by a service type and tenant information. This is not limited in this embodiment of this application.

Optionally, in this embodiment of this application, the first message is an interface message used for communication between a RAN node and a CN node, for example, an NG setup request (NG SETUP REQUEST) message, a gNB configuration update (GNB CONFIGURATION UPDATE) message, or a RAN configuration update (RAN CONFIGURATION UPDATE) message. Correspondingly, the first response message is an interface message used for communication between the RAN node and the CN node, for example, an NG setup request response message or a core network configuration update message.

Optionally, in this embodiment of this application, the first message may be used to instruct the core network node to update a first network slice set supported by the first access network node.

For example, the core network node may add the identification information of the network slice supported by the second access network node to the first network slice set supported by the first access network node. In this way, in some sense, the first network slice set supported by the first access network node may be considered to include a set of network slices supported by the first access network node and the second access network node. For example, in an implementation, the first access network node may provide the network slice service for the terminal device through a dual-connection between the first access network node and the second access network node.

For example, if the first access network node supports a network slice 1 (denoted as an NS 1) and a network slice 2 (denoted as an NS 2), the first network slice set supported by the first access network node includes the NS 1 and the NS 2. If the second access network node supports the NS 1 and a network slice 3 (denoted as an NS 3), the first access network node may add identification information of the NS 1 and the NS 3 to the first message sent to the core network node (or may add only identification information of the NS 3, that is, may add only the identification information of the network slice not supported by the first access network node but supported by the second access network node). Therefore, the core network node may update, based on the first message, the first network slice set supported by the first access network node. For example, the core network node may add the network slices supported by the second access network node to the first network slice set supported by the first access network node. In this case, the first network slice set includes the NS 1, the NS 2, and the NS 3. In this way, when the terminal device initiates a service request message for the NS 3 to the first access network node, the core network node may be prevented from directly rejecting the service request message. Further, the first access network node may provide a network slice service of the NS 3 for the terminal device by using the second access network node. In other words, the first access network node may establish a dual-connection or multi-connection with another access network node, thereby providing more network slice services for the terminal device, and further improving user experience.

It should be noted that in this embodiment of this application, S201 may be performed before the terminal device establishes a connection to the first access network node (denoted as a scenario 1) or after the terminal device establishes a connection to the first access network node (denoted as a scenario 2). This is not limited in this embodiment of this application.

In the scenario 1, to be specific, before the terminal device establishes a radio resource control (radio resource control, RRC) connection to the first access network node, the first access network node may obtain, in advance, a status of a network slice supported by a neighboring access network node of the first access network node, and then report the obtained information to the core network node in advance by using the first message, so that the core network node may add the information about the network slice supported by the neighboring access network node to the first network slice set supported by the first access network node. In this way, after the terminal device establishes the connection to the first access network node, if the terminal device initiates a service request message for a network slice not supported by the first access network node, the core network node may not reject the service request message. Further, the first access network node may provide a network slice service for the terminal device by establishing a dual-connection or multi-connection with another access network node, to improve user experience. Therefore, in the scenario 1, the first access network node does not need to send, each time the terminal device establishes a connection to the first access network node, the first message to the core network node in combination with information about network slices that the terminal device requests to access or is allowed to access, to help reduce information exchange between the first access network node and the core network node.

In the scenario 2, to be specific, after the terminal device establishes the connection to the first access network node, the first access network node may learn of information about the network slices that the terminal device requests to access or is allowed to access. The first access network node may send the first message to the core network node. The first message may include identification information that is of a network slice supported by a neighboring access network node and that is obtained by the first access network node. Optionally, in the scenario 2, the first message may further include identification information of the network slices that the terminal device requests to access or is allowed to access. The terminal device instructs, by using the first message, the core network node to update the first network slice set supported by the first access network node, to prevent the core network node from directly rejecting the service request message of the terminal device for the network slice not supported by the first access network node, where the direct rejection affects user experience. Therefore, in the scenario 2, the first access network node may report information by comprehensively considering the information about the network slices that the terminal device requests to access or is allowed to access. Information about a proper network slice in the network slices that the terminal device requests to access or is allowed to access is added to the first message sent to the core network node, so that a proper network slice service can be provided for the terminal device.

In other words, in this embodiment of this application, the first network slice set supported by the first access network node may be determined based on a status of the network slice supported by the first access network node and a status of the network slice supported by the second access network node. Alternatively, the first network slice set may be determined based on a status of the network slice supported by the first access network node, a status of the network slice supported by the second access network node, and statuses of the network slices that the terminal device requests to access or is allowed to access.

It should be understood that in the scenario 1, the first message may include the identification information of the network slice supported by the second access network node, or may include identification information of the network slice not supported by the first access network node but supported by the second access network node. Alternatively, if the network slice set supported by the second access network node is a subset of the network slice set supported by the first access network node, the first access network node may not report the identification information of the network slice supported by the second access network node. In the scenario 2, information included in the first message may also be the information content in the scenario 1. Alternatively, in the scenario 2, the first access network node may report the information in combination with the information about the network slices that the terminal device requests to access or is allowed to access. For example, the first message may include information about a network slice, not supported by the first access network node, in the network slices that the terminal device requests to access or is allowed to access, or may include information about a network slice, not supported by the first access network node but supported by the second access network node, in the network slices that the terminal device requests to access or is allowed to access. This is not limited in this embodiment of this application.

Optionally, in some embodiments, the method 200 may further include the following step.

S203. The terminal device sends a notification message to the first access network node, where the notification message includes the identification information of the network slices that the terminal device requests to access or is allowed to access.

Specifically, a set including the network slices that the terminal device requests to access or is allowed to access is denoted as a third network slice set. The third network slice set may include a network slice not supported by the first access network node. The terminal device may notify the first access network node of the identification information of the network slices in the third network slice set, so that the first access network node may determine, based on a status of a network slice supported by a neighboring access network node and the third network slice set, whether the first access network node and the neighboring access network node can jointly support each network slice in the third network slice set. If the first access network node and the neighboring access network node can jointly support each network slice in the third network slice set, the first access network node may provide a network slice service for the terminal device through a dual-connection or multi-connection with neighboring access network nodes. For example, if the first access network node supports the NS 1 and the NS 2, but does not support the NS 3, and if the first access network node learns that the second access network node supports the NS 3, the first access network node may provide a service of the NS 3 for the terminal device through a dual-connection between the first access network node and the second access network node.

Optionally, in this embodiment of this application, the notification message may be a radio resource control (radio resource control, RRC) message, for example, an RRC connection request (RRC connection request) message or an RRC connection reestablishment request (RRC connection reestablishment request message, or may be RRC connection setup complete (RRC connection setup complete) information. The RRC connection request message is used to request to establish a connection to a network device, the RRC connection reestablishment request message is used to request to re-establish a connection to the network device, and the RRC connection setup complete information is used to indicate that establishment of a connection to the network device is completed.

Optionally, if the set of network slices supported by the first access network node and the second access network node still cannot provide a service for all the network slices in the third network slice set that the terminal device requests to access or is allowed to access, the first access network node may further provide a network slice service for the terminal device in combination with a status of a network slice supported by another access network node. For example, the first access network node may further report, to the core network node, identification information of a network slice supported by a third access network node, so that the core network node adds the network slice supported by the third access network node to the first network slice set supported by the first access network node.

For example, the third network slice set includes the NS 1, the NS 2, the NS 3, an NS 4, and an NS 5. If the first access network node supports the NS 1 and the NS 2, and the second access network node supports the NS 1 and the NS 3, the set of network slices supported by the first access network node and the second access network node is the NS 1, the NS 2, and the NS 3, and the NS 4 and the NS 5 are still not supported. In this case, the first access network node may further search for an access network node that supports the NS 4 and the NS 5. If the third access network node supports the NS 4 and the NS 5, the first access network node may report, to the core network node, identification information of the network slices supported by the third access network node, so that the core network node may add the NS 4 and the NS 5 to the first network slice set. Further, the first access network node may be used as an MN, and the second access network node and the third access network node may be used as SNs, to provide the terminal device with a network slice service through a multi-connection.

Optionally, in this embodiment of this application, the method 200 may further include the following steps:

S204. The first access network node forwards, to the core network node, a second message sent by the terminal device, where the second message is used to request the core network node to configure service information corresponding to a network slice in a second network slice set, and the second network slice set includes at least one network slice in the first network slice set.

S205. The first access network node receives a second response message sent by the core network node, where the second response message includes the service information corresponding to the network slice in the second network slice set.

S206. The first access network node sends a third message to the second access network node, where the third message includes service information corresponding to a network slice that is in the second network slice set and that is supported by the second access network node.

Specifically, after the terminal device establishes a connection to the first access network node, when the terminal device has a service requirement, the terminal device may send the second message to the core network node by using the first access network node. The second message is used to request to configure the service information corresponding to the network slice in the second network slice set. The second network slice set may include a network slice not supported by the first access network node but supported by the second access network node.

Optionally, the second message may be a protocol data unit (protocol data unit, PDU) session establishment request message, and is used to request the core network node to configure a corresponding resource for a service requested by the terminal device. For example, the terminal device may add the PDU session establishment request message to an uplink RRC message. After receiving the uplink RRC message, the first access network node forwards, to the corresponding core network node, the PDU session establishment request message carried in the uplink RRC message. After receiving the second message, the core network node may initiate a PDU session establishment process based on the second message, to configure the corresponding service information for the network slice in the second network slice set, and then send the second response message to the first access network node. The second response message includes the service information corresponding to the network slice in the second network slice set. Specifically, the second response message may include at least one piece of PDU session information. The at least one piece of PDU session information corresponds to at least one network slice in the second network slice set. Each piece of PDU session information may include at least one of the following information:

1. a PDU session identifier, used to uniquely identify a PDU session;
2. a network slice identifier, used to indicate a network slice corresponding to the PDU session;
3. an aggregate maximum bit rate of PDU session resources, used for PDU session-level flow control;
4. a transport layer address, used to indicate a transport layer address corresponding to the PDU session;
5. a port number, used to indicate a port number corresponding to the PDU session at a transport layer; and
6. quality of service (quality-of-service, QoS) flow information, including a QoS flow indication and a QoS parameter.

Then, the first access network node may obtain, based on the second response message, service information corresponding to the at least one network slice in the second network slice set. If the second network slice set includes at least one network slice not supported by the first access network node, for example, the at least one network slice is not deployed on the first access network node, or the first access network node temporarily cannot support, due to limited resources, the at least one network slice or at least one PDU session corresponding to the at least one network slice, the at least one network slice is denoted as a to-be-added network slice. If the first access network node determines, based on information about the network slice supported by the neighboring access network node, that the second access network node supporting a dual-connection or multi-connection supports the to-be-added network slice. Further, in S206, the first access network node sends the third message to the second access network node. The third message includes service information corresponding to the to-be-added network slice. The second access network node may add, based on the third message, the service information corresponding to the to-be-added network slice.

It should be understood that the third message may include the service information corresponding to the network slice supported by the second access network node in the second network slice set (in this case, the third message may include service information corresponding to a network slice supported by both the first access network node and the second access network node). Alternatively, the third message may include only service information corresponding to the network slice that is in the second network slice set and that is not supported by the first access network node but supported by the second access network node. Alternatively, the third message may include service information corresponding to the network slice supported by the second access network node and service information corresponding to the network slice supported by the first access network node. In other words, the first access network node may send, to the second access network node, service information that corresponds to all network slices and that is configured by the core network node. The second access network node determines supported network slices, and then may add service information corresponding to the supported network slices.

For example, if the second network slice set includes the NS 1, the NS 2, and the NS 4, the first access network node supports the NS 1, the NS 2, and the NS 3, and the second access network node supports the NS 1, the NS 4, and the NS 5, the third message includes at least a PDU session corresponding to the NS 4. Because both the first access network node and the second access network node support the NS 1, the first access network node may provide a service of the NS 1, or the second access network node may provide a service of the NS 1. Therefore, the third message may include a PDU session corresponding to the NS 1, or may not include a PDU session corresponding to the NS 1. For example, the first access network node may determine, when a network of the first access network node is busy, that the second access network node provides the service of the NS 1 for the terminal device, and then adds, to the third message, the PDU session corresponding to the NS 1. The second access network node adds the PDU session. Alternatively, the third message may include all PDU sessions established by the core network node, to be specific, include PDU sessions respectively corresponding to the NS 1, the NS 2, and the NS 4. The second access network node determines, based on statuses of the network slices supported by the second access network node, a PDU session that may be added.

Optionally, in this embodiment of this application, the third message may be a message used for communication between RAN nodes. For example, the third message may be an SN addition request message. The SN addition request message may be further used to request the second access network node to support a dual-connection or multi-connection operation on the terminal device, That is, the terminal device is provided with a service through a dual-connection between the first access network node and the second access network node or multi-connection between the first access network node and more access network nodes.

Optionally, the third message may include at least one of the following information:

1. a UE security capability, used to notify the second access network node of a security capability of the terminal device;

2. a security key applicable to the SN, used by the second access network node to encrypt and decrypt user data;

3. an aggregate maximum bit rate of the terminal device that is applicable to the SN, where an aggregate maximum bit rate of UE is divided into an aggregate maximum bit rate of the UE that is applicable to the MN and an aggregate maximum bit rate of the UE that is applicable to the SN;

4. information about a PDU session needing to be added and/or bearer information corresponding to the PDU session, where for example, PDU session information of a secondary cell group (secondary cell group, SCG) bearer, a split (split) bearer, an SCG split bearer, and the like may be included; and 5. an MN-to-SN container (container), including configuration information that is of an SCG on a UE side and that is generated by the MN, and used by the SN to perform air interface configuration on the UE based on the configuration information carried by the container.

For example, the second message is used to request to configure service information of the NS 1, the NS 2, and the NS 3, the first access network node supports the NS 1 and the NS 2, and the second access network node supports the NS 3. If the core network node establishes, based on the second message, a PDU session 1, a PDU session 2, and a PDU session 3 respectively corresponding to the NS 1, the NS 2, and the NS 3, the core network node sends information about the PDU sessions to a first access network device by using the second response message. Because the first access network node does not support the NS 3, but the second access network node supports the NS 3, the first access network node may send the third message to the second access network node. The third message may include information about the PDU session 3, used to instruct the second access network node to add the PDU session, to provide the terminal device with a network slice service of the NS 3.

Further, in S207, the second access network node sends a third response message to the first access network node.

Optionally, the third response message may be an SN addition request acknowledgment message, or may be another message used for communication between the RAN nodes. The third response message may include information about a PDU session allowed to be added. The information about the PDU session may include content included in the information about the PDU sessions in the foregoing embodiment. Details are not described herein again.

Therefore, according to the communication method in this embodiment of this application, the core network node updates, based on the identification information of the network slice supported by the second access network node, the first network slice set supported by the first access network node. In other words, the first access network node may provide the network slice service for the terminal device through a dual-connection between the first access network node and the second access network node. In this way, when the terminal device initiates the service request for the network slice not supported by the first access network node but supported by the second access network node, the core network node may not reject the request message, and further, the first access network node may provide the network slice service for the terminal device through a dual-connection between the first access network node and the second access network node. Compared with the prior art in which the core network node directly rejects a request message when the first access network node does not support a network slice requested by the terminal device, this application helps improve user experience.

Optionally, in some embodiments, the method 200 may further include the following step.

S208. The first access network node sends a sixth message to the terminal device, where the sixth message is used to configure a dual-connection or multi-connection for the terminal device.

Optionally, the sixth message may be an RRC reconfiguration (RRC reconfiguration) message, or may be another message used for communication between the terminal device and the RAN node. This is not limited in this embodiment of this application.

Then, the terminal device may receive data on the second access network node, for example, may obtain system information of the second access network node. The system information may include a registration/tracking area identity (registration/tracking area code) supported by the second access network node.

Optionally, in some embodiments, if the terminal device determines that the registration/tracking area identity of the second access network node is not in a registration/tracking area list of the terminal device, the method 200 may further include the following step.

S209. The terminal device sends a seventh message to the core network node by using the first access network node, where the seventh message is used to initiate a registration/tracking area update process, and add registration/tracking area information of the second access network node to the registration/tracking area list of the terminal device.

The seventh message may be a tracking area update (tracking area update, TAU) request message. The seventh message may include at least one of the following parameters:

1. a key indication of a non-access stratum (non-access stratum, NAS);

2. an old globally unique user temporary identity; and 3. a discontinuous reception (discontinuous reception; DRX) parameter.

Further, in S210, the core network node replies to the terminal device with a seventh response message by using the first access network node, where the seventh response message is used to accept or reject a registration/tracking area update request initiated by the terminal device.

The seventh response message may include at east one of the following parameters:

1. a registration/tracking area identity list;

2. a rejection reason; and 3. the DRX parameter.

Optionally, the seventh response message may further include some or all of information included in a registration/tracking area request message in an existing LTE system or a 5G system. This is not specifically limited in this embodiment of this application.

It can be learned from the foregoing embodiment that the first access network node may report, to the core network node, the identification information of the network slice supported by the second access network node. Therefore, before S201, the first access network node needs to obtain the identification information of the network slice supported by the second access network node. The following describes in detail, with reference to FIG. 3 to FIG. 5, a manner in which the first access network node obtains the network slice supported by the second access network node (an example of the neighboring access network node).

FIG. 3 is a schematic interaction diagram of a communication method according to an embodiment of this application. In this implementation, there is a communications interface between a first access network node and a second access network node. Therefore, the first access network node and the second access network node may directly communicate to obtain statuses of network slices supported by each other.

As shown in FIG. 3, the method 300 may include the following steps.

S301. The first access network node sends a first request message to the second access network node, where the first request message is used to request identification information of a network slice supported by the second access network node.

S302. The second access network node sends a first request response message to the first access network node, where the first request response message includes the identification information of the network slice supported by the second access network node.

Optionally, the first request message may be a handover request message, or may be another message used for communication between the RAN nodes. Correspondingly, the first request response message may be a handover request acknowledgment message, or may be another message used for communication between the RAN nodes. This is not limited in this embodiment of this application.

Optionally, the first request message may include identification information of a network slice supported by the first access network node. In this way, any two access network nodes having a communications interface in a communications system may learn of, by using the communication method shown in FIG. 3, information about network slices supported by each other.

FIG. 4 is a schematic interaction diagram of a communication method according to another embodiment of this application. In this implementation, there is no communications interface between a first access network node and a second access network node. Therefore, the first access network node and the second access network node cannot directly communicate to obtain statuses of network slices supported by each other. In this case, the first access network node and the second access network node may exchange, by using a terminal device for transit, information about the network slices supported by each other.

As shown in FIG. 4, the method 400 may include the following steps.

S5401. The first access network node sends a first interface message to the terminal device, where the first interface message includes identification information of a network slice supported by the first access network node.

S402. The second access network node sends a second interface message to the terminal device, where the second interface message includes identification information of a network slice supported by the second access network node.

S403. The terminal device sends a third interface message to the first access network node, where the third interface message includes the identification information of the network slice supported by the second access network node.

It should be understood that an execution sequence of S401 and S402 is not limited. For example, S401 may be performed before S402, or S402 may be performed before S401, or S401 and S402 may be simultaneously performed. This is not limited in this embodiment of this application.

Optionally, in this embodiment, the method 400 may further include the following step.

S404. The terminal device sends a fourth interface message to the second access network node, where the fourth interface message includes the identification information of the network slice supported by the first access network node.

Therefore, the first access network node and the second access network node may exchange, in the manner shown in FIG. 4, statuses of the network slices supported by the two access network nodes. Likewise, any two access network nodes in a communications system may exchange, in the manner shown in FIG. 4, statuses of network slices supported by the two access network nodes.

Optionally, the first interface message may be a system message. That is, the first access network node may broadcast, by using the system message, the information about the network slice supported by the first access network node, or may broadcast, by using the system message, information about a network slice supported by a neighboring node of the first access network node. Alternatively, the first interface message may be dedicated signaling, for example, a message used for communication between the terminal device and an access network node, such as an RRC message or a media access control (media access control, MAC) message. Similarly, this is also true for the second interface message. For brevity, details are not described again.

Optionally, the third interface message may be an air interface message, such as an RRC message or a MAC message. This is not limited in this embodiment of this application. Similarly, this is also true for the fourth interface message. For brevity, details are not described again.

Optionally, the first interface message may be an independent message. For example, a dedicated system message may be added to broadcast information about the network slice. Alternatively, the first interface message may be an existing message. For example, an attribute field may be added to the existing message to cam/information about the network slice. Similarly, this is also true for the second interface message. For brevity, details are not described again.

Optionally, the third interface message may be an independent message. For example, an air interface message may be added to send information about the network slice. Alternatively, the third interface message may be an existing air interface message. For example, an attribute field may be added to the existing air interface message to carry information about the network slice. Similarly, this is also true for the fourth interface message. For brevity, details are not described again.

FIG. 5 is a schematic interaction diagram of a communication method according to still another embodiment of this application. In this implementation, there is no communications interface between a first access network node and a second access network node. Therefore, the first access network node and the second access network node cannot directly communicate to obtain statuses of network slices supported by each other. The first access network node and the second access network node exchange, by using a core network for transit, information about the network slices supported by each other.

As shown in FIG. 5, the method 500 may include the following steps.

S501. The first access network node sends a first notification message to the core network node, where the first notification message includes identification information of a network slice supported by the first access network node.

S502. The core network node replies to the first access network node with a first acknowledgment message, where the first acknowledgment message is used to notify the first access network node that the first notification message is received.

S503. The second access network node sends a second notification message to the core network node, where the second notification message includes identification information of a network slice supported by the second access network node.

S504. The core network node replies to the second access network node with a second acknowledgment message, where the second acknowledgment message is used to notify the second access network node that the second notification message is received.

S505. The core network node sends a third notification message to the first access network node, where the third notification message includes the identification information of the network slice supported by the second access network node.

S506. The core network node sends a fourth notification message to the second access network node, where the fourth notification message includes the identification information of the network slice supported by the first access network node.

It should be understood that an execution sequence of S501 and S503 is not limited. For example, S501 may be performed before S503, or S503 may be performed before S501, or S501 and S503 may be simultaneously performed. Similarly, an execution sequence of S505 and S506 is not limited. For example, S505 may be performed before S506, or S506 may be performed before S505, or S505 and S506 may be simultaneously performed. This is not limited in this embodiment of this application.

Optionally, the first notification message may be an N2 interface message, for example, an N2 interface setup request message, a RAN node configuration update request message, or another message used for communication between a RAN node and a CN node. This is not limited in this embodiment of this application. Similarly, this is also true for the second notification message. For brevity, details are not described herein again.

Correspondingly, the first acknowledgment message may alternatively be an N2 interface message, for example, an N2 interface setup response message, a CN node configuration update request message, or another message used for communication between the RAN node and the CN node. This is not limited in this embodiment of this application. Similarly, this is also true for the second acknowledgment message. For brevity, details are not described herein again.

Optionally, the first notification message may be an independent message. For example, a dedicated message may be added to send information about the network slice. Alternatively, the first notification message may be an existing message. For example, an attribute field may be added to the existing message to carry information about the network slice. Similarly, this is also true for other messages. For brevity, details are not described herein again.

Therefore, a RAN node 1 and a RAN node 2 may exchange, in the manner shown in FIG. 5, statuses of network slices supported by the two access network nodes. Likewise, any two access network nodes in a communications system may exchange, in the manner shown in FIG. 5, statuses of network slices supported by the two access network nodes.

It should be understood that an occasion for obtaining, by the first access network node, information about a network slice supported by a neighboring access network node is not particularly limited in this embodiment of this application, provided that the information about the network slice supported by the neighboring access network node is obtained before S201, in other words, provided that execution processes of the method 300, the method 400, and the method 500 are performed before S201.

The foregoing describes the method embodiments of this application in detail with reference to FIG. 2 to FIG. 5. The following describes apparatus embodiments of this application in detail with reference to FIG. 6 to FIG. 11. It should be understood that the apparatus embodiments and the method embodiments correspond to each other. For similar descriptions, refer to the method embodiments.

Figure 6:
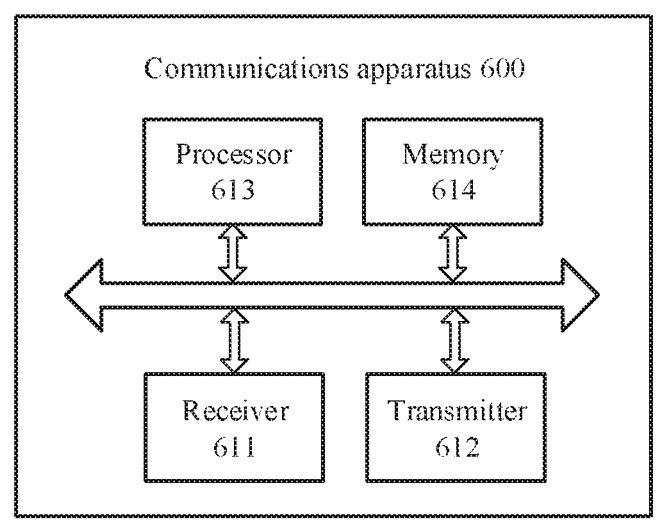
FIG. 6 is a schematic block diagram of a communications apparatus according to an embodiment of this application.

An embodiment of this application provides a communications apparatus. The following describes a structure and functions of the communications apparatus with reference to FIG. 6. FIG. 6 is a schematic block diagram of a communications apparatus 600 according to an embodiment of this application. As shown in FIG. 6, the communications apparatus 600 includes a receiver 611, a transmitter 612, and a processor 613. Optionally, the communications apparatus 600 further includes a memory 614. The receiver 611, the transmitter 612, the processor 613, and the memory 614 communicate with each other through an internal connection path, to transfer a control signal and/or a data signal. The memory 614 is configured to store a computer program. The processor 613 is configured to invoke the computer program from the memory 614 and run the computer program, to control the receiver 611 to receive a signal, and control the transmitter 612 to send a signal. When a program instruction stored in the memory 614 is executed by the processor 613, the transmitter 612 is configured to send a first message to a core network node. The first message includes identification information of a network slice supported by a second access network node.

The receiver 612 is configured to receive a first response message sent by the core network node. The first response message is a response message for the first message.

The processor 613 and the memory 614 may be combined into one processing apparatus. The processor 613 is configured to execute program code stored in the memory 614, to implement the foregoing function. During specific implementation, the memory 614 may alternatively be integrated into the processor 613, or may be independent of the processor 613.

It should be understood that the communications apparatus 600 may correspond to the first access network node (namely, the RAN node 1) in the communication method 200, the communication method 300, the communication method 400, or the communication method 500 according to the embodiments of this application. The communications apparatus 600 may include modules configured to perform the method performed by the first access network node in the communication method 200, the method 300, the method 400, or the method 500. In addition, the modules or units in the communications apparatus 600 are respectively configured to perform the actions or the processing processes performed by the first access network node in the communication method 200, the communication method 300, the communication method 400, or the communication method 500. Herein, to avoid repetition, detailed descriptions are omitted.

Figure 7:
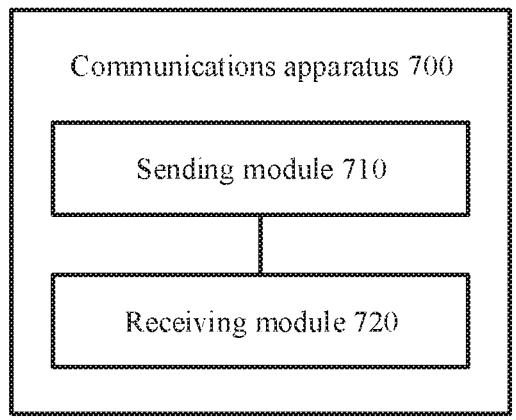
FIG. 7 is another schematic block diagram of a communications apparatus according to an embodiment of this application.

An embodiment of this application further provides a communications apparatus. The following describes a structure and functions of the communications apparatus with reference to FIG. 7. FIG. 7 is another schematic block diagram of a communications apparatus 700 according to an embodiment of this application. As shown in FIG. 7, the communications apparatus 700 includes a sending module 710 and a receiving module 720.

The sending module 710 and the receiving module 720 may be implemented by software or hardware. When the sending module 710 and the receiving module 720 are implemented by hardware, the receiving module 720 may be the receiver 611 in FIG. 6, and the sending module 710 may be the transmitter 612 in FIG. 6.

Figure 8:
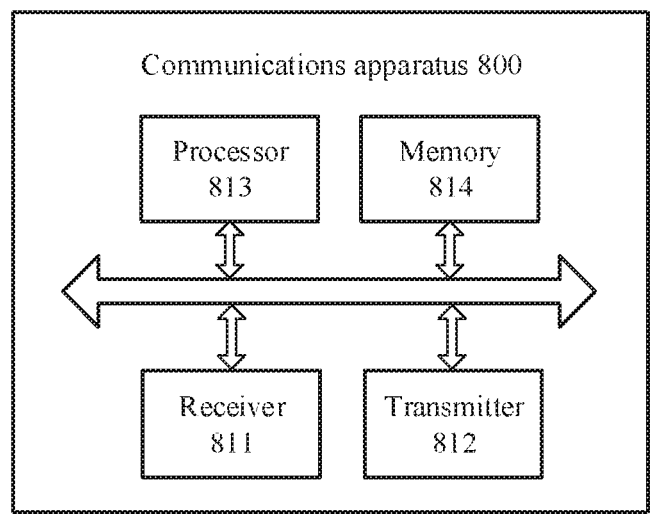
FIG. 8 is a schematic block diagram of a communications apparatus according to an embodiment of this application.

An embodiment of this application provides a communications apparatus. The following describes a structure and functions of the communications apparatus with reference to FIG. 8. FIG. 8 is a schematic block diagram of a communications apparatus 800 according to an embodiment of this application. As shown in FIG. 8, the communications apparatus 800 includes a receiver 811, a transmitter 812, and a processor 813. Optionally, the communications apparatus 800 further includes a memory 814. The receiver 811, the transmitter 812, the processor 813, and the memory 814 communicate with each other through an internal connection path, to transfer a control signal and/or a data signal. The memory 814 is configured to store a computer program. The processor 813 is configured to invoke the computer program from the memory 814 and run the computer program, so that the receiver 811 receives a signal, and the transmitter 812 sends a signal. When a program instruction stored in the memory 814 is executed by the processor 813, the receiver 811 is configured to receive a first message sent by a first access network node. The first message includes identification information of a network slice supported by a second access network node.

The transmitter 812 is configured to send a first response message to the first access network node. The first response message is a response message for the first message.

The processor 813 and the memory 814 may be combined into one processing apparatus. The processor 813 is configured to execute program code stored in the memory 814, to implement the foregoing function. During specific implementation, the memory 814 may alternatively be integrated into the processor 813, or may be independent of the processor 813. It may be understood that, optionally, during specific implementation, the receiver 811 and the transmitter 812 may be integrated together to implement communication interaction between network nodes.

It should be understood that the communications apparatus 800 may correspond to the core network node (namely, the CN node) in the communication method 200 or the communication method 500 according to the embodiments of this application. The communications apparatus 800 may include modules configured to perform the method performed by the core network node in the communication method. 200 or the communication method 500. In addition, the modules or units in the communications apparatus 800 are respectively configured to perform the actions or the processing processes performed by the core network node in the communication method. 200 or the communication method 500. Herein, to avoid repetition, detailed descriptions are omitted.

Figure 9:
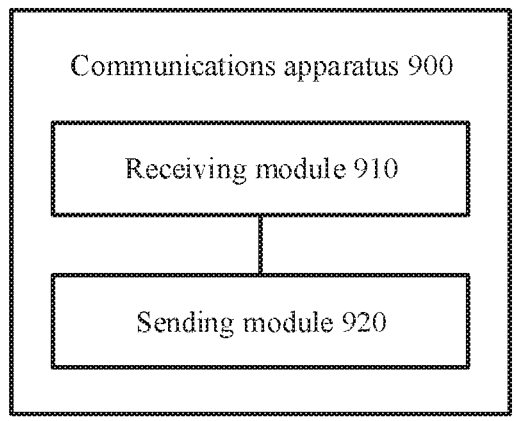
FIG. 9 is another schematic block diagram of a communications apparatus according to an embodiment of this application.

An embodiment of this application further provides a communications apparatus. The following describes a structure and functions of the communications apparatus with reference to FIG. 9. FIG. 9 is another schematic block diagram of a communications apparatus 900 according to an embodiment of this application. As shown in FIG. 9, the communications apparatus 900 includes a receiving module 910 and a sending module 920.

The receiving module 910 and the sending module 920 may be implemented by software or hardware. When the receiving module 910 and the sending module 920 are implemented by hardware, the receiving module 910 may be the receiver 811 in FIG. 8, and the sending module 920 may be the transmitter 812 in FIG. 8.

Figure 10:
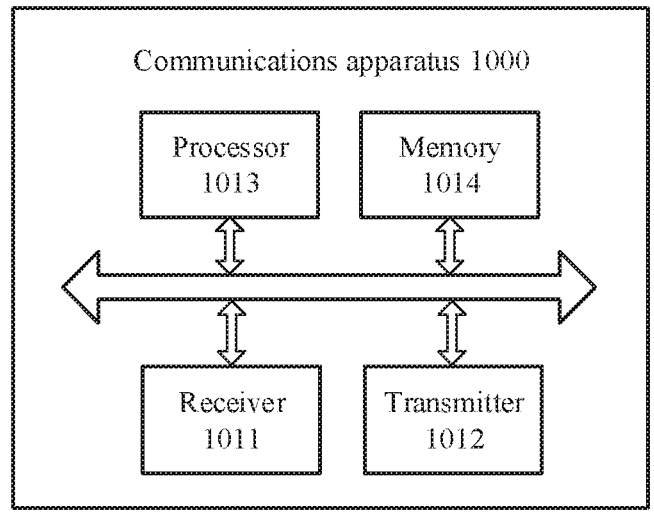
FIG. 10 is a schematic block diagram of a communications apparatus according to an embodiment of this application.

An embodiment of this application provides a communications apparatus. The following describes a structure and functions of the communications apparatus with reference to FIG. 10. FIG. 10 is a schematic block diagram of a communications apparatus 1000 according to an embodiment of this application. As shown in FIG. 10, the communications apparatus 1000 includes a receiver 1011, a transmitter 1012, and a processor 1013. Optionally, the communications apparatus 1000 further includes a memory 1014. The receiver 1011, the transmitter 1012, the processor 1013, and the memory 1014 communicate with each other through an internal connection path, to transfer a control signal and/or a data signal. The memory 1014 is configured to store a computer program. The processor 1013 is configured to invoke the computer program from the memory 1014 and run the computer program, to control the receiver 1011 to receive a signal, and control the transmitter 1012 to send a signal. When a program instruction stored in the memory 1014 is executed by the processor 1013, the receiver 1011 is configured to receive a fifth message sent by a second access network node. The fifth message includes identification information of a network slice supported by the second access network node.

The transmitter 1012 is configured to send a fourth message to a first access network node, where the fourth message includes a network slice identifier corresponding to the network slice supported by the second access network node.

The processor 1013 and the memory 1014 may be combined into one processing apparatus. The processor 1013 is configured to execute program code stored in the memory 1014, to implement the foregoing function. During specific implementation, the memory 1014 may alternatively be integrated into the processor 1013, or may be independent of the processor 1013. It may be understood that, optionally, during specific implementation, the receiver 1011 and the transmitter 1012 may be integrated together to implement communication interaction between network nodes.

It should be understood that the communications apparatus 1000 may correspond to the terminal device in the communication method 200 or the communication method 400 according to the embodiments of this application. The communications apparatus 1000 may include modules configured to perform the method performed by the terminal device in the communication method 200 or the method 400. In addition, the modules or units in the communications apparatus 1000 are respectively configured to perform the actions or the processing processes performed by the terminal device in the communication method 200 or the communication method 400. Herein, to avoid repetition, detailed descriptions are omitted.

Figure 11:
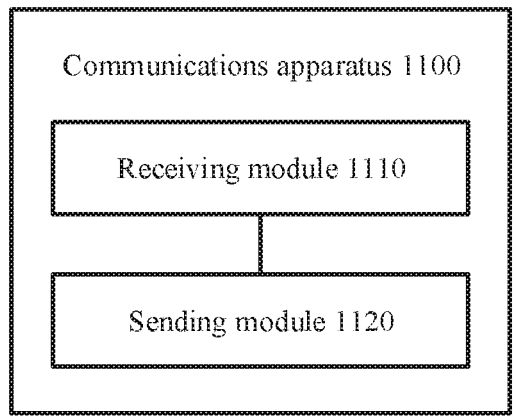
FIG. 11 is another schematic block diagram of a communications apparatus according to an embodiment of this application.

An embodiment of this application further provides a communications apparatus. The following describes a structure and functions of the communications apparatus with reference to FIG. 11. FIG. 11 is another schematic block diagram of a communications apparatus 1100 according to an embodiment of this application. As shown in FIG. 11, the communications apparatus 1100 includes a receiving module 1110 and a sending module 1120.

The receiving module 1110 and the sending module 1120 may be implemented by software or hardware. When the receiving module 1110 and the sending module 1120 are implemented by hardware, the receiving module 1110 may be the receiver 1011 in FIG. 10, and the sending module 1120 may be the transmitter 1012 in FIG. 10.

It should be noted that the foregoing method embodiments may be applied to a processor or may be implemented by a processor. The processor may be an integrated circuit chip and has a signal processing capability. In an implementation process, the steps in the foregoing method embodiments may be completed by using a hardware integrated logical circuit in the processor or an instruction in a form of software. The foregoing processor may be a general purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. The steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in a memory. The processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM), used as an external cache. By way of example rather than limitative description, many forms of RAMs may be used, for example, a static random access memory (Static RAM. SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory of the systems and the methods described in this specification includes but is not limited to these and any memory of another proper type.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that the sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms. The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of the embodiments of this application, but the protection scope of the embodiments of this application is not limited thereto. Any variation or replacement readily figured out by a person skilled in the art within the technical scope disclosed in the embodiments of this application shall fall within the protection scope of the embodiments of this application.

What is claimed is:

1. An access network communication apparatus comprising:
   a non-transitory computer-readable memory comprising computer-executable instructions; and
   at least one processor in communication with the non-transitory computer-readable memory, wherein the computer-executable instructions instruct the at least one processor to perform operations comprising:
      sending, to a core network node, a first message comprising identification information identifying a network slice, wherein the network slice is supported by a second access network node and the network slice is unsupported by the access network communication apparatus, wherein a dual-connection between the access network communication apparatus and the second access network node is established to serve a terminal device, and wherein the first message instructs the core network node to add the network slice supported by the second access network node to a first network slice set that comprises one or more network slices supported by the access network communication apparatus; and
      receiving, from the core network node, a first response message responsive to the first message.

2. The access network communication apparatus according to claim 1, wherein the first network slice set is determined based on: (1) information associated with a network slice supported by the access network communication apparatus and information associated with a network slice supported by the second access network node, or (2) information associated with a network slice supported by the access network communication apparatus, information associated with the network slice supported by the second access network node, and information associated with a network slice that the terminal device requests to access or is allowed to access.

3. The access network communication apparatus according to claim 1, wherein the computer-executable instructions further instruct the at least one processor to perform operations comprising:
   forwarding, to the core network node, a second message sent by the terminal device, wherein the second message requests the core network node to configure service information corresponding to a network slice in a second network slice set, and the second network slice set comprises at least one network slice in the first network slice set;
   receiving, a second response message sent by the core network node, wherein the second response message comprises the service information corresponding to the network slice in the second network slice set; and
   sending, a third message to the second access network node, wherein the third message comprises service information corresponding to the network slice in the second network slice set and supported by the second access network node.

4. The access network communication apparatus according to claim 1, wherein the computer-executable instructions further instruct the at least one processor to perform operations comprising:
   receiving, a fourth message sent by the terminal device, wherein the fourth message comprises the identification information of the network slice supported by the second access network node, and the identification information is sent by the second access network node to the terminal device.

5. The access network communication apparatus of claim 1, wherein the first message is at least one of an NG setup request message, a gNB configuration update message, or a radio access network configuration update message.

6. A core network communication apparatus comprising:
   a non-transitory computer-readable memory comprising computer-executable instructions; and
   at least one processor in communication with the non-transitory computer-readable memory, wherein the computer-executable instructions instruct the at least one processor to perform operations comprising:
      receiving, from a first access network node, a first message comprising identification information identifying a network slice, wherein the network slice is supported by a second access network node and the network slice is unsupported by the first access network node wherein a dual-connection between the first access network node and the second access network node is established to serve a terminal device, and wherein the first message instructs the core network communication apparatus to add the network slice supported by the second access network node to a first network slice set that comprises one or more network slices supported by the first access network node; and
      sending, to the first access network node, a first response message responsive to the first message.

7. The core network communication apparatus according to claim 6, wherein the first network slice set is determined based on: (1) information associated with a network slice supported by the first access network node and information associated with a network slice supported by the second access network node, or (2) the first network slice set is determined based on information associated with a network slice supported by the first access network node, information associated with the network slice supported by the second access network node, and information associated with a network slice that the terminal device requests to access or is allowed to access.

8. The core network communication apparatus according to claim 6, wherein the computer-executable instructions further instruct the at least one processor to perform operations comprising:
   receiving, a second message sent by the terminal device through the first access network node, wherein the second message requests the core network communication apparatus to configure service information corresponding to a network slice in a second network slice set, and the second network slice set comprises at least one network slice in the first network slice set; and
   sending, a second response message to the first access network node, wherein the second response message comprises the service information corresponding to the network slice in the second network slice set.

9. The core network communication apparatus of claim 6, wherein the first message is at least one of an NG setup request message, a gNB configuration update message, or a radio access network configuration update message.

10. A wireless communication apparatus comprising:
a non-transitory computer-readable memory comprising computer-executable instructions; and
at least one processor in communication with the non-transitory computer-readable memory, wherein the computer-executable instructions instruct the at least one processor to perform operations comprising:
receiving, from a first access network node, a first message comprising identification information identifying a network slice, wherein the network slice is supported by a second access network node and the network slice is unsupported by the first access network node wherein a dual-connection between the first access network node and the second access network node is established to serve a terminal device, and wherein the first message instructs the wireless communication apparatus to add the network slice to a first network slice set that comprises one or more network slices supported by the second access network node; and
sending, to a second access network node, a second message comprising a network slice identifier corresponding to the network slice supported by the first access network node.

11. The wireless communication apparatus of claim 10, wherein the first message is at least one of an NG setup request message, a gNB configuration update message, or a radio access network configuration update message.

12. A communication system, comprising:
a first access network node and a core network node;
the first access network node is configured to send, to the core network node, a first message comprising identification information identifying a network slice, wherein the network slice is supported by a second access network node and the network slice is unsupported by the first access network node, wherein a dual-connection between the first access network node and the second access network node is established to serve a terminal device, and wherein the message instructs the core network node to add the network slice supported by the second access network node to a first network slice set that comprises one or more network slices supported by the first access network node; and
the core network node is configured to send, to the first access network node, a response message responsive to the message.

13. The communication system according to claim 12, wherein the first network slice set is determined based on: (1) information associated with a network slice supported by the first access network node and information associated with a network slice supported by the second access network node, or (2) the first network slice set is determined based on information associated with a network slice supported by the first access network node, information associated with the network slice supported by the second access network node, and information associated with a network slice that the terminal device requests to access or is allowed to access.

14. The communication system of claim 12, wherein the first message is at least one of an NG setup request message, a gNB configuration update message, or a radio access network configuration update message.

* * * * *

UNITED STATES PATENT AND TRADEMARK OFFICE
CERTIFICATE OF CORRECTION

PATENT NO. : 11,432,234 B2
APPLICATION NO. : 16/886411
DATED : August 30, 2022
INVENTOR(S) : Chong Lou, Rui Wang and Mingzeng Dai Page 1 of 1

It is certified that error appears in the above-identified patent and that said Letters Patent is hereby corrected as shown below:

In the Claims

In Column 30, In Line 32, In Claim 6, delete "node" and insert -- node, --.

In Column 31, In Line 19, In Claim 10, delete "node" and insert -- node, --.

Signed and Sealed this
Twenty-fifth Day of April, 2023

Katherine Kelly Vidal
*Director of the United States Patent and Trademark Office*